US012807542B2

(12) United States Patent
Lorenz et al.

(10) Patent No.: US 12,807,542 B2
(45) Date of Patent: Nov. 24, 2026

(54) SET CONTROL COMPOSITION FOR CEMENTITIOUS SYSTEMS

(71) Applicant: Construction Research & Technology GmbH, Trostberg (DE)

(72) Inventors: Klaus Lorenz, Trostberg (DE); Massimo Bandiera, Trostberg (DE); Sabine Himmelein, Trostberg (DE); Bernhard Sachsenhauser, Trostberg (DE)

(73) Assignee: CONSTRUCTION RESEARCH & TECHNOLOGY GMBH, Trostberg (DE)

(*) Notice: Subject to any disclaimer, the term of this patent is extended or adjusted under 35 U.S.C. 154(b) by 805 days.

(21) Appl. No.: 18/023,101

(22) PCT Filed: Aug. 25, 2021

(86) PCT No.: PCT/EP2021/073437
§ 371 (c)(1),
(2) Date: Feb. 24, 2023

(87) PCT Pub. No.: WO2022/043350
PCT Pub. Date: Mar. 3, 2022

(65) Prior Publication Data
US 2024/0034689 A1 Feb. 1, 2024

(30) Foreign Application Priority Data
Aug. 26, 2020 (EP) .................................... 20192855

(51) Int. Cl.
*C04B 40/00* (2006.01)
*C04B 22/08* (2006.01)
(Continued)

(52) U.S. Cl.
CPC .......... *C04B 40/0039* (2013.01); *C04B 22/08* (2013.01); *C04B 24/003* (2013.01);
(Continued)

(58) Field of Classification Search
CPC ................ C04B 40/0039; C04B 22/08; C04B 24/003; C04B 24/045; C04B 24/06; C04B 24/10;
(Continued)

(56) References Cited

U.S. PATENT DOCUMENTS 4,175,975 A 11/1979 MacWilliams et al.
4,204,877 A * 5/1980 Moorer .................. B02C 23/06 106/726
5,792,252 A 8/1998 Sprouts

FOREIGN PATENT DOCUMENTS

CN 103502177 A 1/2014
WO WO-2012143206 A1 * 10/2012 ............ C04B 28/14
(Continued)

OTHER PUBLICATIONS

Sun et al. Influence of glycerin grinding aid on the compatibility between cement and polycarboxylate superplasticizer and its mechanism. Construction and Building Materials 233 (2020) 117104 (pp. 1-9). (Year: 2020).*
(Continued)

*Primary Examiner* — John E Uselding
(74) *Attorney, Agent, or Firm* — Curatolo Sidoti & Trillis Co., LPA; Floyd Trillis, III; Salvatore A. Sidoti

(57) ABSTRACT

A set control composition for cementitious systems comprises a retarder (a) selected from (a-1) polymeric polycarboxylic acids selected from homopolymers and copolymers of α,β-ethylenically unsaturated carboxylic acids; and copolymers of at least one α,β-ethylenically unsaturated carboxylic acid and at least one sulfo group containing monomer; and salts thereof, whose milliequivalent number of carboxyl groups is 3.0 meq/g or higher, preferably 3.0 to 17.0 meq/g, and having a molecular weight 25,000 g/mol or less, assuming all the carboxyl groups to be in unneutralized form, (a-2) phosphonic acids and salts thereof, (a-3) low molecular weight polycarboxylic acids and salts thereof, and mixtures thereof, (b) at least one of (b-1) a borate source and (b-2) a carbonate source, wherein the carbonate source is selected
(Continued)

from inorganic carbonates having an aqueous solubility of 0.1 $g \cdot L^{-1}$ or more at 25 °C, and organic carbonates, in a weight ratio of b) to a) in the range of 0.1 to 10, (c) a polyol having at least 3 alcoholic hydroxyl groups in its molecule, in a weight ratio of c) to a) in the range of 0.2 to 4, and (d) a dispersant. The set control composition effectively improves workability of cementitious systems for prolonged periods of time without compromising early compressive strength. The compositions show sufficient open time, i.e., the time until initial setting, good workability during said open time as characterized, for example by adequate slump flow over time, and fast setting. The invention further relates to a construction composition comprising i) a cementitious binder comprising one or more calcium silicate mineral phases and one or more calcium aluminate mineral phases, ii) optionally, an extraneous aluminate source, iii) a sulfate source, and iv) the set control composition. The construction composition contains 0.05 to 0.2 mol of total available aluminate, calculated as $Al(OH)_4^-$, from the calcium aluminate mineral phases plus the optional extraneous aluminate source, per 100 g of cementitious binder i), and the molar ratio of total available aluminate to sulfate is 0.4 to 2.0.

15 Claims, 1 Drawing Sheet

(51) Int. Cl.

| | |
|---|---|
| ***C04B 24/00*** | (2006.01) |
| ***C04B 24/04*** | (2006.01) |
| ***C04B 24/06*** | (2006.01) |
| ***C04B 24/10*** | (2006.01) |
| ***C04B 24/26*** | (2006.01) |
| ***C04B 28/16*** | (2006.01) |
| *C04B 103/22* | (2006.01) |
| *C04B 103/40* | (2006.01) |

(52) U.S. Cl.

CPC ............ *C04B 24/045* (2013.01); *C04B 24/06* (2013.01); *C04B 24/10* (2013.01); *C04B 24/2641* (2013.01); *C04B 24/2664* (2013.01); *C04B 28/16* (2013.01); *C04B 2103/22* (2013.01); *C04B 2103/408* (2013.01)

(58) Field of Classification Search

CPC ............ C04B 24/2641; C04B 24/2664; C04B 28/16

See application file for complete search history.

(56) References Cited

FOREIGN PATENT DOCUMENTS

| | | |
|---|---|---|
| WO | 2019077050 A1 | 4/2019 |
| WO | 2020173723 A1 | 9/2020 |

OTHER PUBLICATIONS

Ataman Chemicals Products; Detergents, Cosmetics, Disinfectants, Pharmaceutical Chemicals; 1-Hydroxyethylidene-1,1-Diphosphonic Acid. (Year: 2020).*

International Search Report for Application No. PCT/EP2021/073437 dated Dec. 9, 2021.

Written Opinion for Application No. PCT/EEP2021/073437 dated Dec. 9, 2021.

* cited by examiner

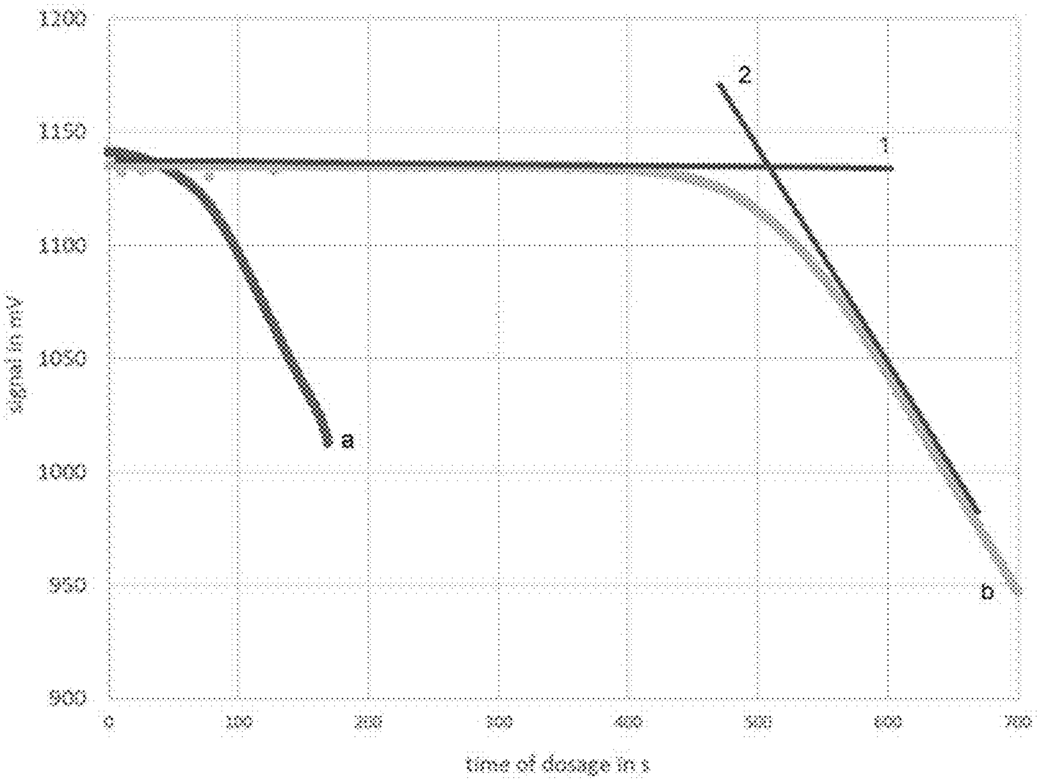
1200
1150
1100
1050
1000
950
900
0
100
200
300
400
500
600
700
signal in mV
time of dosage in s
1
2
a
b

SET CONTROL COMPOSITION FOR CEMENTITIOUS SYSTEMS

CROSS REFERENCE TO RELATED APPLICATIONS

This application is a national stage application of International Application No. PCT/EP2021/073437, filed 25 Aug. 2021, which claims priority from European Patent Application No. 20192855.3, filed 26 Aug. 2020, both of which applications are incorporated herein by reference.

The present invention relates to a set control composition for cementitious systems and a construction composition comprising the set control composition.

It is known that dispersants are added to aqueous slurries or pulverulent hydraulic binders for improving their workability, i.e. kneadability, spreadability, sprayability, pumpability or flowability. Such admixtures are capable of preventing the formation of solid agglomerates and of dispersing the particles already present and those newly formed by hydration and in this way improving the workability. This effect is utilized in the preparation of construction compositions which contain hydraulic binders, such as cement, lime, gypsum, hemihydrate or anhydrite. In order to convert the pulverulent binders into a freshly mixed processible form, substantially more mixing water is required than would be necessary for the subsequent hydration and hardening process. The voids formed in the concrete body by the excess of water which subsequently evaporates lead to poor mechanical strength and resistance. In order to reduce the excess proportion of water at a predetermined processing consistency and/or to improve the workability at a predetermined water/binder ratio, admixtures are used which are generally referred to as water-reducing agents or plasticizers.

Upon hydration of the cementitious system, generally ettringite is generated in a rapid reaction. This reaction is responsible for the development of early compressive strength of the cementitious composition. However, the newly formed minute ettringite crystals tend to deteriorate the workability or flowability of the cementitious composition. It has been known to add set control agents or retarders to the composition in order to delay the reaction and improve workability. The retarders delay the hydration onset by inhibiting the dissolution of the reactive cement components, in particular aluminates, and/or by masking the calcium ions thereby slowing down the hydration reaction.

U.S. Pat. No. 5,792,252 relates to cement admixtures containing an alkali metal carbonate and a mono- or dicarboxylate acid or alkali metal salt thereof or an alkali metal salt of a tricarboxylic acid.

U.S. Pat. No. 4,175,975 relates to water-soluble salts of low-molecular weight polyacrylic acids functioning with inorganic salts to reduce water demand of dispersed inorganic solids, such as Portland cement.

WO 2019/077050 describes a set control composition for cementitious systems comprising an amine-glyoxylic acid condensate and at least one of a borate source and a carbonate source. Under certain conditions, the amine-glyoxylic acid condensate may be susceptible to hydrolysis.

There is a need for further set control compositions for cementitious systems. In particular, there is a need for set control compositions that effectively improve workability of cementitious systems for prolonged periods of time without compromising early compressive strength. In particular the compositions should show sufficient open time, i.e., the time until initial setting, good workability during said open time as characterized, for example by adequate slump flow over time, and fast setting.

The above problems are solved by a set control composition for cementitious systems comprising

- a) a retarder selected from
  - (a-1) polymeric polycarboxylic acids selected from homopolymers and copolymers of α,β-ethylenically unsaturated carboxylic acids; and copolymers of at least one α,β-ethylenically unsaturated carboxylic acid and at least one sulfo group containing monomer; and salts thereof, whose milliequivalent number of carboxyl groups is 3.0 meq/g or higher, preferably 3.0 to 17.0 meq/g, more preferably 5.0 to 17.0 meq/g, most preferably 5.0 to 14.0 meq/g, and having a molecular weight 25,000 g/mol or less, preferably in the range of 1,000 to 25,000 g/mol, assuming all the carboxyl groups to be in unneutralized form,
  - (a-2) phosphonic acids and salts thereof,
  - (a-3) low molecular weight polycarboxylic acids and salts thereof, and mixtures thereof,
- b) at least one of
  - (b-1) a borate source and
  - (b-2) a carbonate source, wherein the carbonate source is selected from inorganic carbonates having an aqueous solubility of 0.1 $g \cdot L^{-1}$ or more at 25 °C, and organic carbonates, in a weight ratio of b) to a) in the range of 0.1 to 10,
- c) a polyol having at least 3 alcoholic hydroxyl groups in its molecule, in a weight ratio of c) to a) in the range of 0.2 to 4, and
- d) a dispersant.

By the term polymeric polycarboxylic acid, as used herein, is meant a polymeric compound constituted of monomeric units incorporating carboxylic acid functionalities, and, optionally, further monomeric units.

Although the above ingredients a) through d) have been used individually or as sub-combinations, lacking at least one of the above ingredients, it has surprisingly been found that a combination of all ingredients a), b), c) and d) according to the invention act in a synergistic fashion. Due to the excellent retarding action of the inventive set control composition, the dosage of dispersant(s) necessary to obtain a given flowability of the cementitious system can be reduced.

The set control composition according to the invention comprises a retarder a) selected from (a-1) through (a-3) or mixtures thereof. It is believed that the retarder a) in combination with borate ions or carbonate ions from component b), retard the formation of ettringite from the aluminate phases originating from the cementitious binder.

Ingredient (a-1) is a polymeric polycarboxylic acid selected from homopolymers and copolymers of α, β-ethylenically unsaturated carboxylic acids; and copolymers of at least one α,β-ethylenically unsaturated carboxylic acid and at least one sulfo group containing monomer; and a salt thereof. The polymeric polycarboxylic acid can be employed as the free acid or in a partially or completely neutralized form, i.e., as a salt. The cation is not particularly limited and may be selected from alkali metals, such as sodium or potassium, and ammonium cations.

The molecular weight of the polymeric polycarboxylic acids is 25,000 g/mol or less, preferably the molecular weight is in the range of 1,000 to 25,000 g/mol, most preferably 1,000 to 5,000 g/mol. The molecular weight may be measured by the gel permeation chromatography method (GPC) as indicated in detail in the experimental part.

Effective polymeric polycarboxylic acids have a carboxylic group density within a certain range. According to the invention, the milliequivalent number is 3.0 meq/g or higher, preferably 3.0 to 17.0 meq/g, more preferably 5.0 to 17.0 meq/g, most preferably 5.0 to 14.0 meq/g.

The polymeric polycarboxylic acid is selected from homopolymers and copolymers of α,β-ethylenically unsaturated carboxylic acids; and copolymers of at least one α,β-ethylenically unsaturated carboxylic acid and at least one sulfo group containing monomer. Suitable α,β-ethylenically unsaturated carboxylic acids include acrylic acid, methacrylic acid and polymaleic acid.

Suitable sulfo group containing monomers include 2-propene-1-sulfonic acid (allylsulfonic acid), 2-methyl-2-propene-1-sulfonic acid (methallylsulfonic acid), vinylsulfonic acid, styrenesulfonic acids, i.e. 2-styrenesulfonic acid, 3-styrenesulfonic acid and 4-styrenesulfonic acid, and 2-acrylamido-2-methylpropane sulfonic acid (AMPS).

Preferably, the polymeric polycarboxylic acid is a homopolymer of acrylic acid, a homopolymer of methacrylic acid, a copolymer of acrylic acid and maleic acid, or a copolymer of methacrylic acid and maleic acid, most preferably a homopolymer of acrylic acid.

Examples of suitable polymeric components are commercially available from BASF SE under the trade name SOKALAN®, such as SOKALAN® PA 20, SOKALAN® PA 15, SOKALAN® CP 10S, SOKALAN® PA 25 CL PN, SOKALAN® CP 12S, SOKALAN® PA 40. "CP" generally designates a copolymer whereas "PA" generally designates a polyacrylate.

Suitable phosphonic acids and salts thereof (a-2) are in particular polyphosphonic acids and salts thereof and include 1-hydroxyethylidene-1,1-diphosphonic acid (HEDP), amino-tris(methylenephosphonic acid) (ATMP) or [[(2-hydroxyethyl)imino]bis(methylene)]-bisphosphonic acid and mixtures thereof. The respective chemical formulae of the preferred di- or triphosphonates are given in the following:

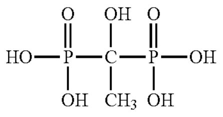

(HEDP)

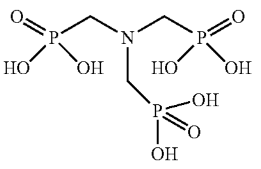

(ATMP)

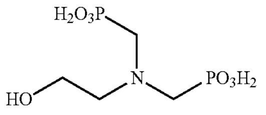

([[(2-hydroxyethyl)imino]bis (methylene)]bisphosphonic acid)

Suitable phosphonic acids and salts thereof (a-2) further include phosphonoalkyl-carboxylic acids and salts thereof, such as 1-phosphonobutane-1,2,4-tricarboxylic acid, 2-phosphonobutane-1,2,4-tricarboxylic acid, 3-phosphonobutane-1,2,4-tricarboxylic acid, 4-phosphonobutane-1,2,4-tricarboxylic acid, 2,4-diphosphonobutane-1,2,4-tricarboxylic acid, 2-phosphonobutane-1,2,3,4-tetracarboxylic acid, 1-methyl-2-phosphonopentane-1,2,4-tricarboxylic acid, and 1,2-phosphonoethane-2-dicarboxylic acid.

Suitable low molecular weight polycarboxylic acids and salts thereof (a-3) have a molecular weight of, e.g., 500 g/mol or lower and include aliphatic polycarboxylic acids, such as oxalic acid, malonic acid, succinic acid, glutaric acid, adipic acid, pimelic acid, fumaric acid, maleic acid, itaconic acid, citraconic acid, mesaconic acid, malic acid, tartaric acid, and citric acid.

Suitable low molecular weight polycarboxylic acids and salts thereof (a-3) further include amino carboxylic acids and salts thereof, such as ethylenediamine tetra acetic acid and nitrilotriacetic acid.

In one embodiment, the retarder a) comprises a combination of (a-2) and (a-3).

Ingredient b) is at least one of (b-1) a borate source and (b-2) a carbonate source.

The presence of a borate or carbonate source ensures that the mixing water is initially highly concentrated in borate or carbonate ions. Borate or carbonate ions are believed to adsorb onto mineral phase surfaces along with retarder a). The latter will also partly remain in the pore solution and initially prevent ettringite to be formed.

The borate source usually comprises a rapidly soluble, inexpensive, borate compound. Suitable borate sources include borax, boric acid, colemanite and hexahydroborate.

Only carbonate sources having a sufficient degree of aqueous solubility are suitable for achieving the desired effect. The carbonate source may be an inorganic carbonate having an aqueous solubility of 0.1 $g \cdot L^{-1}$ or more at 25 °C. The aqueous solubility of the inorganic carbonate is suitably determined in water with a starting pH value of 7. It is understood that the pH value at the solubility limit is higher than the starting pH value.

The inorganic carbonate may be selected from alkaline metal carbonates such as sodium carbonate, sodium bicarbonate, potassium carbonate or lithium carbonate, and alkaline earth metal carbonates satisfying the required aqueous solubility, such as magnesium carbonate. It is also possible to use guanidine carbonate as an inorganic carbonate. Sodium carbonate and sodium bicarbonate are especially preferred, in particular sodium carbonate.

Alternatively, the carbonate source is selected from organic carbonates. "Organic carbonate" denotes an ester of carbonic acid. The organic carbonate is hydrolyzed in the presence of the cementitious system to release carbonate ions. In an embodiment, the organic carbonate is selected from ethylene carbonate, propylene carbonate, glycerol carbonate, dimethyl carbonate, di(hydroxyethyl)carbonate or a mixture thereof, preferably ethylene carbonate, propylene carbonate, and glycerol carbonate or a mixture thereof, and in particular ethylene carbonate and/or propylene carbonate. Mixtures of inorganic carbonates and organic carbonates can as well be used.

The weight ratio of ingredient b) to ingredient a) is in the range from 0.1 to 10, preferably 0.8 to 5.

Ingredient c) is a polyol. The polyol is employed in a weight ratio of ingredient c) to a) in the range of 0.2 to 4, preferably 0.2 to 2, most preferably 0.2 to 0.5.

It is believed that polyols such as glycerol chelate calcium ions of e.g. calcium sulfate or C3A. As a result, calcium ion dissociation is accelerated. Chelation of calcium ions also stabilizes calcium in solution and accelerates the dissolution of calcium aluminate phases, thereby rendering aluminate from these calcium aluminate phases more accessible.

"Polyol" is intended to denote a compound having at least two alcoholic hydroxyl groups in its molecule. Useful polyols according to the invention have at least 3 alcoholic hydroxyl groups in its molecule, for example 3, 4, 5 or 6 alcoholic hydroxyl groups. Polyols having vicinal hydroxyl groups are preferred. Polyols having at least three hydroxyl groups bound to three carbon atoms in sequence are most preferred.

The ability of the polyol to chelate calcium ions and thereby stabilize calcium in solution can be assessed by a calcium aluminate precipitation test. In an embodiment, the polyol, in a calcium aluminate precipitation test in which a test solution, obtained by supplementing 400 mL of a 1 wt.-% aqueous solution of the polyol with 20 mL of a 1 mol/L NaOH aqueous solution and 50 mL of a 25 mmol/L $NaAlO_2$ aqueous solution, is titrated with a 0.5 mol/L $CaCl_2$ aqueous solution at 20 °C, inhibits precipitation of calcium aluminate up to a calcium concentration of 75 ppm, preferably 90 ppm.

The test detects the precipitation of calcium aluminate by turbidity. Initially, the test solution is a clear solution. The clear test solution is titrated with a $CaCl_2$ aqueous solution at a constant dosage rate of, e.g., 2 mL/min, as described above. With ongoing addition of $CaCl_2$, precipitation of calcium aluminate results in a change of the optical properties of the test solution by turbidity. The titration endpoint, expressed as the maximum calcium concentration (as $Ca^{2+}$), before the onset of turbidity can be calculated from the elapsed time to the onset point.

In a preferred embodiment, the polyol c) is selected from compounds consisting of carbon, hydrogen, and oxygen only and does not contain a carboxyl group (COOH) in its molecule.

In an embodiment, the polyol is selected from monosaccharides, oligosaccharides, water-soluble polysaccharides, compounds of general formula (P-I) or dimers or trimers of compounds of general formula (P-I):

(P-I)

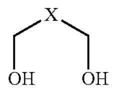

wherein X is (P-Ia)

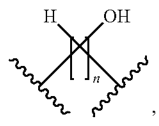

, (P-Ib)

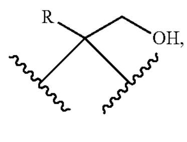

or (P-Ic)

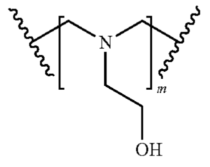

wherein

R is $—CH_2OH$, $—NH_2$, n is an integer from 1 to 4, m is an integer from 1 to 8.

In one embodiment, the polyol c) is selected from saccharides. Useful saccharides include monosaccharides, such as glucose and fructose; disaccharides, such as lactose and sucrose; trisaccharides, such as raffinose; and water-soluble polysaccharides, such as amylose and maltodextrins. Monosaccharides and disaccharides, in particular sucrose, are especially preferred.

In another preferred embodiment, the polyol c) is selected from compounds consisting of carbon, hydrogen, and oxygen only and contains neither a carboxyl group (COOH) nor a carbonyl group (C═O) in its molecule. It is understood that the term "carbonyl group" encompasses the tautomeric form of the C═O group, i.e. a pair of doubly bonded carbon atoms adjacent to a hydroxyl group (—C═C(OH)—).

Compounds of formula (P-I) wherein X is (P-Ia) are generally referred to as sugar alcohols. Sugar alcohols are organic compounds, typically derived from sugars, containing one hydroxyl group (—OH) attached to each carbon atom. Useful sugar alcohols are mannitol, sorbitol, xylitol, arabitol, erythritol and glycerol. Among these, glycerol is particularly preferred. It is envisaged that carbonates of polyhydric alcohols such as glycerol carbonate can act as a polyol source.

Compounds of formula (P-I) wherein X is (P-Ib) include pentaerythritol, and tris(hydroxymethyl)aminomethane.

Compounds of formula (P-I) wherein X is (P-Ic) include triethanolamine.

Dimers or trimers denote compounds wherein two or three molecules of general formula (P-I) are linked via an ether bridge and which are formally derived from a condensation reaction with elimination of one or two molecules of water. Examples of dimers and trimers of compounds of formula (P-I) include dipentaerythritol and tripentaerythritol.

In an embodiment, the set control composition further comprises a co-retarder e) selected from hydroxy monocarboxylic acids and salts thereof. The co-retarder e) is known as such and allows for prolongation of the open time.

Preferably, the co-retarder e) is present in a weight ratio of e) to a) in the range of 0.05 to 1.

Suitable hydroxy monocarboxylic acids or salts thereof are preferably α-hydroxy monocarboxylic acids and salts thereof and include glycolic acid, gluconic acid, and their salts and mixtures thereof. Sodium gluconate is particularly preferred.

Although not preferred, the set control composition or a construction composition containing the same may comprise setting accelerators as conventionally used, e.g., in repair mortars and self-levelling underlayments, such as lithium salts, in particular lithium carbonate or lithium sulfate. It is an advantageous feature of the invention that the early strength development of the construction composition is such that lithium setting accelerators can be dispensed with. Hence, in preferred embodiments, the set control composition or construction composition containing the same do not contain a lithium setting accelerator. This also serves to reduce the cost of the construction composition, as lithium setting accelerators are quite costly ingredients.

Ingredient d) is a dispersant. Dispersants useful in cement applications are known as such. For the purposes herein, the term dispersants includes plasticizers and superplasticizers.

It will be appreciated that a number of useful dispersants contain carboxyl groups, salts thereof or hydrolysable groups releasing carboxyl groups upon hydrolysis. Preferably, the milliequivalent number of carboxyl groups contained in these dispersant (or of carboxyl groups releasable upon hydrolysis of hydrolysable groups contained in the dispersant) is lower than 3.0 meq/g, assuming all the carboxyl groups to be in unneutralized form.

Examples of useful dispersants include comb polymers having a carbon-containing backbone to which are attached pendant cement-anchoring groups and polyether side chains, non-ionic comb polymers having a carbon-containing backbone to which are attached pendant hydrolysable groups and polyether side chains, the hydrolysable groups upon hydrolysis releasing cement-anchoring groups, colloidally disperse preparations of polyvalent metal cations, such as $Al^{3+}$, $Fe^{3+}$ or $Fe^{2+}$, and a polymeric dispersant which comprises anionic and/or anionogenic groups and polyether side chains, and the polyvalent metal cation is present in a superstoichiometric quantity, calculated as cation equivalents, based on the sum of the anionic and anionogenic groups of the polymeric dispersant, sulfonated melamine-formaldehyde condensates, lignosulfonates, sulfonated ketone-formaldehyde condensates, sulfonated naphthalene-formaldehyde condensates, phosphonate containing dispersants, preferably the phosphonate containing dispersants comprise at least one polyalkylene glycol unit, and mixtures thereof.

Preferably, the dispersant d) is present in a weight ratio of d) to a) in the range of 0.05 to 3.

Comb polymers having a carbon-containing backbone to which are attached pendant cement-anchoring groups and polyether side chains are particularly preferred. The cement-anchoring groups are anionic and/or anionogenic groups such as carboxylic groups, phosphonic or phosphoric acid groups or their anions. Anionogenic groups are the acid groups present in the polymeric dispersant, which can be transformed to the respective anionic group under alkaline conditions.

Preferably, the structural unit comprising anionic and/or anionogenic groups is one of the general formulae (Ia), (Ib), (Ic) and/or (Id):

Ia

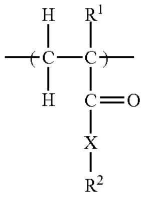

wherein $R^1$ is H, $C_1$-$C_4$ alkyl, $CH_2COOH$ or $CH_2CO$—X—$R^{3A}$, preferably H or methyl;

X is NH—($C_{n1}H_{2n1}$) or —O—($C_{n1}H_{2n1}$) with n1=1, 2, 3 or 4, or a chemical bond, the nitrogen atom or the oxygen atom being bonded to the CO group;

$R^2$ is OM, $PO_3M_2$, or O—$PO_3M_2$; with the proviso that X is a chemical bond if $R^2$ is OM;

$R^{3A}$ is $PO_3M_2$, or O—$PO_3M_2$;

Ib

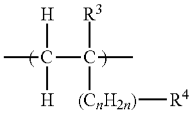

wherein $R^3$ is H or $C_1$-$C_4$ alkyl, preferably H or methyl;

n is 0, 1, 2, 3 or 4;

$R^4$ is $PO_3M_2$, or O—$PO_3M_2$;

Ic

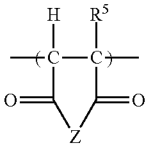

wherein $R^5$ is H or $C_1$-$C_4$ alkyl, preferably H;

Z is O or $NR^7$;

$R^7$ is H, ($C_{n1}H_{2n1}$)—OH, ($C_{n1}H_{2n1}$)—$PO_3M_2$, ($C_{n1}H_{2n1}$)—$OPO_3M_2$, ($C_6H_4$)—$PO_3M_2$, or ($C_6H_4$)—$OPO_3M_2$, and n1 is 1, 2, 3 or 4;

Id

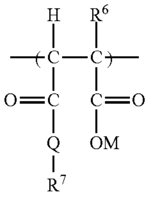

wherein $R^6$ is H or $C_1$-$C_4$ alkyl, preferably H;

Q is $NR^7$ or O;

$R^7$ is H, ($C_{n1}H_{2n1}$)—OH, ($C_{n1}H_{2n1}$)—$PO_3M_2$, ($C_{n1}H_{2n1}$)—$OPO_3M_2$, ($C_6H_4$)—$PO_3M_2$, or ($C_6H_4$)—$OPO_3M_2$, n1 is 1, 2, 3 or 4; and where each M independently is H or a cation equivalent.

Preferably, the structural unit comprising a polyether side chain is one of the general formulae (IIa), (IIb), (IIc) and/or (IId):

IIa

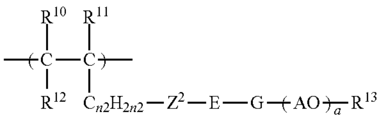

wherein $R^{10}$, $R^{11}$ and $R^{12}$ independently of one another are H or $C_1$-$C_4$ alkyl, preferably H or methyl;

$Z^2$ is O or S;

E is $C_2$-$C_6$ alkylene, cyclohexylene, $CH_2$-$C_6H_{10}$, 1,2-phenylene, 1,3-phenylene or 1,4-phenylene;

G is O, NH or CO—NH; or

E and G together are a chemical bond;

A is $C_2$-$C_5$ alkylene or $CH_2CH(C_6H_5)$, preferably $C_2$-$C_3$ alkylene;

n2 is 0, 1, 2, 3, 4 or 5;

a is an integer from 2 to 350, preferably 10 to 150, more preferably 20 to 100;

$R^{13}$ is H, an unbranched or branched $C_1$-$C_4$ alkyl group, CO—$NH_2$ or $COCH_3$;

IIb

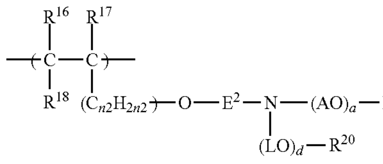

wherein $R^{16}$, $R^{27}$ and $R^{28}$ independently of one another are H or $C_1$-$C_4$ alkyl, preferably H;

$E^2$ is $C_2$-$C_6$ alkylene, cyclohexylene, $CH_2$—$C_6H_{10}$, 1,2-phenylene, 1,3-phenylene, or 1,4-phenylene, or is a chemical bond;

A is $C_2$-$C_5$ alkylene or $CH_2CH(C_6H_5)$, preferably $C_2$-$C_3$ alkylene;

n2 is 0, 1, 2, 3, 4 or 5;

L is $C_2$-$C_5$ alkylene or $CH_2CH(C_6H_5)$, preferably $C_2$-$C_3$ alkylene;

a is an integer from 2 to 350, preferably 10 to 150, more preferably 20 to 100;

d is an integer from 1 to 350, preferably 10 to 150, more preferably 20 to 100;

$R^{19}$ is H or $C_1$-$C_4$ alkyl; and $R^{20}$ is H or $C_1$-$C_4$ alkyl;

IIc

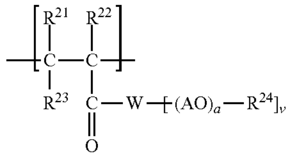

wherein $R^{21}$, $R^{22}$ and $R^{23}$ independently are H or $C_1$-$C_4$ alkyl, preferably H;

W is O, $NR^{25}$, or is N;

V is 1 if W=O or $NR^{25}$, and is 2 if W=N;

A is $C_2$-$C_5$ alkylene or $CH_2CH(C_6H_5)$, preferably $C_2$-$C_3$ alkylene;

a is an integer from 2 to 350, preferably 10 to 150, more preferably 20 to 100;

$R^{24}$ is H or $C_1$-$C_4$ alkyl;

$R^{25}$ is H or $C_1$-$C_4$ alkyl;

IId

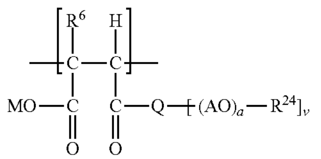

wherein $R^6$ is H or $C_1$-$C_4$ alkyl, preferably H;

Q is $NR^{10}$, N or O;

V is 1 if Q=O or $NR^{10}$ and is 2 if Q=N;

$R^{10}$ is H or $C_1$-$C_4$ alkyl;

A is $C_2$-$C_5$ alkylene or $CH_2CH(C_6H_5)$, preferably $C_2$-$C_3$ alkylene; and a is an integer from 2 to 350, preferably 10 to 150, more preferably 20 to 100;

where each M independently is H or a cation equivalent.

The molar ratio of structural units (I) to structural units (II) varies from 1:3 to about 10:1, preferably 1:1 to 10:1, more preferably 3:1 to 6:1. The polymeric dispersants comprising structural units (I) and (II) can be prepared by conventional methods, for example by free radical polymerization or controlled radical polymerization. The preparation of the dispersants is, for example, described in EP 0 894 811, EP 1 851 256, EP 2 463 314, and EP 0 753 488.

A number of useful dispersants contain carboxyl groups, salts thereof or hydrolysable groups releasing carboxyl groups upon hydrolysis. Preferably, the milliequivalent number of carboxyl groups contained in these dispersants (or of carboxyl groups releasable upon hydrolysis of hydrolysable groups contained in the dispersant) is lower than 3.0 meq/g, assuming all the carboxyl groups to be in unneutralized form.

More preferably, the dispersant is selected from the group of polycarboxylate ethers (PCEs). In PCEs, the anionic groups are carboxylic groups and/or carboxylate groups. The PCE is preferably obtainable by radical copolymerization of a polyether macromonomer and a monomer comprising anionic and/or anionogenic groups. Preferably, at least 45 mol-%, preferably at least 80 mol-% of all structural units constituting the copolymer are structural units of the polyether macromonomer or the monomer comprising anionic and/or anionogenic groups.

A further class of suitable comb polymers having a carbon-containing backbone to which are attached pendant cement-anchoring groups and polyether side chains comprise structural units (III) and (IV):

III

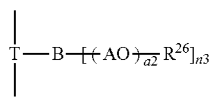

wherein

T is phenyl, naphthyl or heteroaryl having 5 to 10 ring atoms, of which 1 or 2 atoms are heteroatoms selected from N, O and S;

n3 is 1 or 2;

B is N, NH or O, with the proviso that n3 is 2 if B is N and n3 is 1 if B is NH or O;

A is $C_2$-$C_5$ alkylene or $CH_2CH(C_6H_5)$, preferably $C_2$-$C_3$ alkylene;

a2 is an integer from 1 to 300;

$R^{26}$ is H, $C_1$-$C_{10}$ alkyl, $C_5$-$C_8$ cycloalkyl, aryl, or heteroaryl having 5 to 10 ring atoms, of which 1 or 2 atoms are heteroatoms selected from N, O and S;

where the structural unit (IV) is selected from the structural units (IVa) and (IVb):

IVa

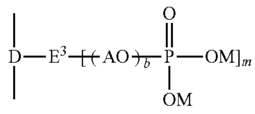

wherein

D is phenyl, naphthyl or heteroaryl having 5 to 10 ring atoms, of which 1 or 2 atoms are heteroatoms selected from N, O and S;

$E^3$ is N, NH or O, with the proviso that m is 2 if $E^3$ is N and m is 1 if $E^3$ is NH or O;

A is $C_2$-$C_5$ alkylene or $CH_2CH(C_6H_5)$, preferably $C_2$-$C_3$ alkylene;

b is an integer from 0 to 300;

M independently is H or a cation equivalent;

IVb

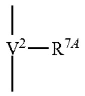

wherein $V^2$ is phenyl or naphthyl and is optionally substituted by 1 or two radicals selected from $R^8$, OH, $OR^8$, $(CO)R^8$, COOM, $COOR^8$, $SO_3R^8$ and $NO_2$;

$R^{7A}$ is COOM, $OCH_2COOM$, $SO_3M$ or $OMO_3M_2$;

M is H or a cation equivalent; and $R^8$ is $C_1$-$C_4$ alkyl, phenyl, naphthyl, phenyl-$C_1$-$C_4$ alkyl or $C_1$-$C_4$ alkylphenyl.

Polymers comprising structural units (III) and (IV) are obtainable by polycondensation of an aromatic or heteroaromatic compound having a polyoxyalkylene group attached to the aromatic or heteroaromatic core, an aromatic compound having a carboxylic, sulfonic or phosphate moiety, and an aldehyde compound such as formaldehyde.

In an embodiment, the dispersant is a non-ionic comb polymer having a carbon-containing backbone to which are attached pendant hydrolysable groups and polyether side chains, the hydrolysable groups upon hydrolysis releasing cement-anchoring groups. Conveniently, the structural unit comprising a polyether side chain is one of the general formulae (IIa), (IIb), (IIc) and/or (IId) discussed above. The structural unit having pendant hydrolysable groups is preferably derived from acrylic acid ester monomers, more preferably hydroxyalkyl acrylic monoesters and/or hydroxyalkyl diesters, most preferably hydroxypropyl acrylate and/or hydroxyethyl acrylate. The ester functionality will hydrolyze to (deprotonated) acid groups upon exposure to water at preferably alkaline pH, which is provided by mixing the cementitious binder with water, and the resulting acid functional groups will then form complexes with the cement component.

In one embodiment, the dispersant is selected from colloidally disperse preparations of polyvalent metal cations, such as $Al^{3+}$, $Fe^{3+}$ or $Fe^{2+}$, and a polymeric dispersant which comprises anionic and/or anionogenic groups and polyether side chains. The polyvalent metal cation is present in a superstoichiometric quantity, calculated as cation equivalents, based on the sum of the anionic and anionogenic groups of the polymeric dispersant. Such dispersants are described in further detail in WO 2014/013077 A1, which is incorporated by reference herein.

Suitable sulfonated melamine-formaldehyde condensates are of the kind frequently used as plasticizers for hydraulic binders (also referred to as MFS resins). Sulfonated melamine-formaldehyde condensates and their preparation are described in, for example, CA 2 172 004 A1, DE 44 1 1 797 A1, U.S. Pat. Nos. 4,430,469, 6,555,683 and CH 686 186 and also in Ullmann's Encyclopedia of Industrial Chemistry, 5th Ed., vol. A2, page 131, and Concrete Admixtures Handbook—Properties, Science and Technology, 2. Ed., pages 411, 412. Preferred sulfonated melamine-formaldehyde condensates encompass (greatly simplified and idealized) units of the formula

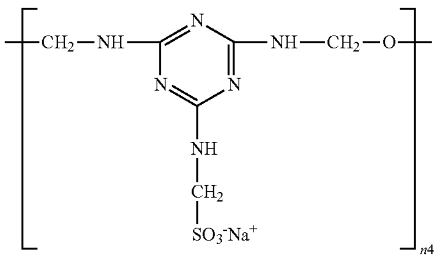

in which n4 stands generally for 10 to 300. The molar weight is situated preferably in the range from 2500 to 80 000. Additionally, to the sulfonated melamine units it is possible for other monomers to be incorporated by condensation. Particularly suitable is urea. Moreover, further aromatic units as well may be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. An example of melaminesulfonate-formaldehyde condensates are the Melment® products distributed by Master Builders Solutions Deutschland GmbH.

Suitable lignosulfonates are products which are obtained as by-products in the paper industry. They are described in Ullmann's Encyclopedia of Industrial Chemistry, 5th Ed., vol. A8, pages 586, 587. They include units of the highly simplified and idealizing formula

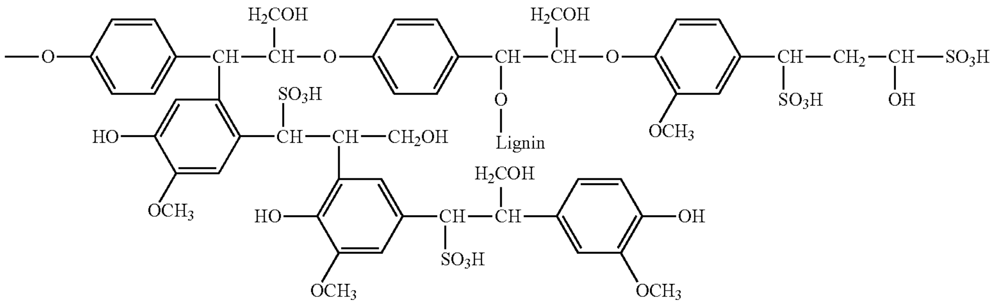

Lignosulfonates have molar weights of between 2000 and 100 000 g/mol. In general, they are present in the form of their sodium, calcium and/or magnesium salts. Examples of suitable lignosulfonates are the Borresperse products distributed by Borregaard LignoTech, Norway.

Suitable sulfonated ketone-formaldehyde condensates are products incorporating a monoketone or diketone as ketone component, preferably acetone, butanone, pentanone, hexanone or cyclohexanone. Condensates of this kind are known and are described in WO 2009/103579, for example. Sulfonated acetone-formaldehyde condensates are preferred. They generally comprise units of the formula (according to J. Plank et al., J. Appl. Poly. Sci. 2009, 2018-2024):

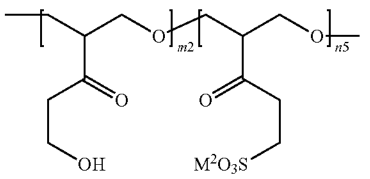

where m2 and n5 are generally each 10 to 250, $M^2$ is an alkali metal ion, such as Nat, and the ratio m2:n5 is in general in the range from about 3:1 to about 1:3, more particularly about 1.2:1 to 1:1.2. Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. Examples of suitable sulfonated acetone-formaldehyde condensates are the Melcret K1L products distributed by Master Builders Solutions Deutschland GmbH.

Suitable sulfonated naphthalene-formaldehyde condensates are products obtained by sulfonation of naphthalene and subsequent polycondensation with formaldehyde. They are described in references including Concrete Admixtures Handbook—Properties, Science and Technology, 2. Ed., pages 411-413 and in Ullmann's Encyclopedia of Industrial Chemistry, 5th Ed., vol. A8, pages 587, 588. They comprise units of the formula

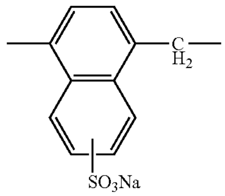

Typically, molar weights (Mw) of between 1000 and 50 000 g/mol are obtained. Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. Examples of suitable sulfonated β-naphthalene-formaldehyde condensates are the Melcret 500 L products distributed by Master Builders Solutions Deutschland GmbH.

Generally, phosphonate containing dispersants incorporate phosphonate groups and polyether side groups.

Suitable phosphonate containing dispersants are those according to the following formula $$R—(OA^2)_{n6}\text{-}N—[CH_2—PO(OM^3{}_2)_2]_2$$

wherein

R is H or a hydrocarbon residue, preferably a $C_1$-$C_{15}$ alkyl radical, $A^2$ is independently $C_2$-$C_{18}$ alkylene, preferably ethylene and/or propylene, most preferably ethylene, n6 is an integer from 5 to 500, preferably 10 to 200, most preferably 10 to 100, and $M^3$ is H, an alkali metal, ½ alkaline earth metal and/or an amine.

The set control composition according to the invention can be present as a solution or dispersion, in particular an aqueous solution or dispersion. The solution or dispersion suitably has a solids content of 10 to 50% by weight, in particular 25 to 35% by weight. Alternatively, the set control composition according to the invention can be present as a powder which is obtainable, e.g., by drum-drying, spray drying or flash-drying. The set control composition according to the invention may be introduced into the mixing water or introduced during the mixing of the mortar or concrete.

The set control composition can be used to control the setting time of a variety of cementitious binders, for example Portland cement, calcium aluminate cement and sulfoaluminate cement. In an embodiment, the cementitious binder comprises a mixture of Portland cement and aluminate cement, or a mixture of Portland cement and sulfoaluminate cement or a mixture of Portland cement, aluminate cement and sulfoaluminate cement. In particular, the set control composition is used in a construction composition with a controlled concentration of total available aluminate.

The present invention also relates to a construction composition comprising i) a cementitious binder comprising one or more calcium silicate mineral phases and one or more calcium aluminate mineral phases, ii) optionally, an extraneous aluminate source, iii) a sulfate source, wherein the construction composition contains 0.05 to 0.2 mol of total available aluminate, calculated as $Al(OH)_4^-$, from the calcium aluminate mineral phases plus the optional extraneous aluminate source, per 100 g of cementitious binder i), and the molar ratio of total available aluminate to sulfate is 0.4 to 2.0, wherein the construction composition additionally comprises iv) a set control composition comprising iv-a) a retarder selected from (a-1) polymeric polycarboxylic acids selected from homopolymers and copolymers of α,β-ethylenically unsaturated carboxylic acids; and copolymers of at least one α,β-ethylenically unsaturated carboxylic acid and at least one sulfo group containing monomer; and salts thereof, whose milliequivalent number of carboxyl groups is 3.0 meq/g or higher, preferably 3.0 to 17.0 meq/g, having a molecular weight 25,000 g/mol or less, preferably in the range of 1,000 to 25,000 g/mol, assuming all the carboxyl groups to be in unneutralized form, (a-2) phosphonic acids and salts thereof, (a-3) low molecular weight polycarboxylic acids and salts thereof, and mixtures thereof;

iv-b) at least one of (b-1) a borate source and (b-2) a carbonate source, wherein the carbonate source is selected from inorganic carbonates having an aqueous solubility of 0.1 $g \cdot L^{-1}$ or more, and organic carbonates;

iv-c) a polyol having at least 3 alcoholic hydroxyl groups in its molecule; and iv-d) a dispersant.

Generally, the amount of cementitious binder i) in the construction composition is at least 8 wt.-%, preferably at least 10 wt.-%, more preferably at least 15 wt.-%, most preferably at least 20 wt.-%, relative to the solids content of the construction composition.

Ingredients iv-a) through iv-d) correspond to ingredients a) through d) as described above. The discussion and preferred embodiments above apply for both the set control composition and the construction composition.

In an embodiment, the construction composition comprises, relative to the amount of cementitious binder i)

the retarder iv-a) in an amount of 0.1 to 2 wt.-%, preferably 0.3 to 0.6 wt.-%, the borate/carbonate source iv-b) in an amount of 0.2 to 1 wt.-%, preferably 0.3 to 0.6 wt.-%, and polyol iv-c) in an amount of 0.2 to 2.5 wt.-%, preferably 0.3 to 1 wt.-%.

While the amount of polyol iv-c) can suitably be varied within the ranges above, it has been found that the optimum amount of polyol iv-c) to be added to the inventive construction composition to some degree depends on the fineness of the cement clinker. As a general rule, the amount of polyol iv-c) is 0.2 to 1 wt.-%, relative to the amount of cementitious binder i), if the Blaine surface area of cementitious binder i) is 1500 to 4000 $cm^2/g$, and the amount of polyol iv-c) is more than 1 to 2.5 wt.-%, relative to the amount of cementitious binder i), if the Blaine surface area is more than 4000 $cm^2/g$. However, additions such as fillers or supplemental cementitious materials can to some extent obscure the Blaine surface area of the clinker. The general rule above therefore applies primarily to cementitious binders containing essentially no additions such as fillers or supplemental cementitious materials. The Blaine surface area may be determined according to DIN EN 196-6.

In an embodiment, the set control composition or the construction composition of the invention do not contain an amine-glyoxylic acid condensate, such as melamine-glyoxylic acid condensates, urea-glyoxylic acid condensates, melamine-urea-glyoxylic acid condensates or polyacrylamide-glyoxylic acid condensates, or glyoxylic acid adducts, such as glyoxylic acid bisulfite adducts, or glyoxylic acid or salts thereof.

In general, the calcium silicate mineral phases and calcium aluminate mineral phases constitute at least 90 wt.-% of the cementitious binder i). Further, the calcium silicate mineral phases preferably constitute at least 60 wt.-% of the cementitious binder i), more preferably at least 65 wt.-%, most preferably 65 to 75 wt.-%.

Conveniently, the mineralogical phases are herein indicated by their cement notation. The primary compounds are represented in the cement notation by the oxide varieties: C for CaO, M for MgO, S for $SiO_2$, A for $Al_2O_3$, $ for $SO_3$, F for $Fe_2O_3$, and H for $H_2O$.

Suitably, the calcium silicate mineral phases are selected from C3S (elite) and C2S (belite). The calcium silicate mineral phases provide primarily final strength properties.

Suitably, the calcium aluminate mineral phases are selected from C3A, C4AF and C12A7, in particular C3A and C4AF.

In an embodiment, the cementitious binder i) is Portland cement, in particular ordinary Portland cement (OPC). The term "Portland cement" denotes any cement compound containing Portland clinker, especially CEM I within the meaning of standard EN 197-1, paragraph 5.2. A preferred cement is ordinary Portland cement (OPC) according to DIN EN 197-1. The phases constituting Portland cement mainly are elite (C35), belite (C25), calcium aluminate (C3A), calcium ferroaluminate (C4AF) and other minor phases. Commercially available OPC may either contain calcium sulfate (<7 wt.-%) or is essentially free of calcium sulfate (<1 wt.-%).

According to the invention, the construction composition contains 0.05 to 0.2 mol of total available aluminate, calculated as $Al(OH)_4$, from the calcium aluminate mineral phases plus the optional extraneous aluminate source, per 100 g of cementitious binder i). Preferably, the construction composition contains at least 0.065 mol, in particular at least 0.072 mol, of total available aluminate, per 100 g of cementitious binder i).

It has been found that construction compositions containing at least 0.05 mol of total available aluminate per 100 g of cementitious binder i) exhibit optimum performance regarding open time before setting and early strength development. Otherwise, if the cementitious binder contains more than 0.2 mol of total available aluminate per 100 g of cementitious binder i), open time is shorter as early strength development is too fast.

Commonly, approximate proportions of the main minerals in Portland cement are calculated by the Bogue formula which in turn is based on the elemental composition of the clinker determined, e.g., by means of X-ray fluorescence (XRF). Such methods provide the oxide composition of the elements. This means that the amount of Al is reported as $Al_2O_3$. It has been found that cements with apparently the same $Al_2O_3$ content exhibit quite different properties regarding early strength and controllability by hydration control. Cement includes very different sources of Al of mineralogical nature and solubility. The present inventors have found that not all Al is available or accessible for the formation of ettringite. Only Al-containing mineral phases with adequate solubility in the aqueous environment of the cement paste participate in the formation of ettringite. Other Al-containing minerals such as crystalline aluminum oxides, e.g. corundum, do not generate aluminate in aqueous environments, due to their limited solubility. Consequently, elemental analysis alone cannot provide reliable values for available aluminate.

Hence, the invention relies on the available aluminate, calculated as $Al(OH)_4^-$. "Available aluminate" is meant to encompass mineral phases and Al-containing compounds that are capable of generating $Al(OH)_4^-$ in alkaline aqueous environments. Calcium aluminate phases, such as C3A ($Ca_3Al_2O_6$), dissolve in an alkaline aqueous environment to yield $Al(OH)_4^-$ and $Ca^{2+}$ ions. For the purpose of this invention, the concentration of mineral phases and Al-containing compounds that are capable of generating $Al(OH)_4^-$ is expressed as mol of $Al(OH)_4^-$ per 100 g of cementitious binder i).

It is believed that the common calcium aluminate mineral phases—in contrast to crystalline aluminum oxides—are sources of available aluminate. Therefore, the amount of available aluminate in a given cementitious binder may be determined by methods capable of discriminating between the mineral phases constituting the cementitious binder. A useful method for this purpose is Rietveld refinement of an X-ray diffraction (XRD) powder pattern. This software technique is used to refine a variety of parameters, including lattice parameters, peak position, intensities and shape. This allows theoretical diffraction patterns to be calculated. As soon as the calculated diffraction pattern is almost identical to the data of an examined sample, precise quantitative information on the contained mineral phases can be determined.

Generally, calcium aluminate mineral phases capable of generating $Al(OH)_4^-$ in alkaline aqueous environments are tricalcium aluminate (C3A), monocalcium aluminate (CA), mayenite (C12A7), grossite (CA2), Q-phase (C20A13M3S3) or tetracalcium aluminoferrite (C4AF). For practical purposes, if the cementitious binder i) is Portland cement, it generally suffices to assess the following mineral phases only: tricalcium aluminate (C3A), monocalcium aluminate (CA), mayenite (C12A7) and tetracalcium aluminoferrite (C4AF), in particular tricalcium aluminate (C3A) and tetracalcium aluminoferrite (C4AF).

Alternatively, the amount of available aluminate may be obtained by determining the total amount of Al from the elemental composition of the cementitious binder i), e.g., by XRF, and subtracting therefrom the amount of crystalline aluminum compounds not capable of generating available aluminate, as determined by XRD and Rietveld refinement. This method also takes into account amorphous, soluble aluminum compounds capable of generating available aluminate. Such crystalline aluminum compounds not capable of generating available aluminates include compounds of the melilite group, e.g., gehlenite (C2AS), compounds of the spinel group, e.g., spinel (MA), mullite ($Al_2Al_{2+2x}Si_{2-2x}O_{10-x}$), and corundum ($Al_2O_3$).

In one embodiment, the invention makes use of cementitious binders containing 0.05 to 0.2 mol of available aluminate from calcium aluminate mineral phases, as determined by, e.g., XRD analysis.

Alternatively, if the cementitious binder i) intrinsically contains an insufficient concentration of available aluminate per 100 g of cementitious binder i), an extraneous aluminate source ii) can be added. Hence in some embodiments, the construction composition contains an extraneous aluminate source ii).

The extraneous aluminate source ii) provides available aluminate as defined above. Suitably, the extraneous aluminate source ii) is selected from non-calciferous aluminate sources, such as aluminum(III) salts, aluminum(III) complexes, crystalline aluminum hydroxide, amorphous aluminum hydroxide; and calciferous aluminate sources such as high alumina cement, sulfoaluminate cement or synthetic calcium aluminate mineral phases.

Useful aluminum(III) salts are aluminum(III) salts which readily form $Al(OH)_4^-$ in an alkaline aqueous environment. Suitable aluminum(III) salts include, but are not limited to, aluminum halides, such as aluminum(III) chloride, and their corresponding hydrates, amorphous aluminum oxides, aluminum hydroxides or mixed forms thereof, aluminum sulfates or sulfate-containing aluminum salts, such as potassium alum, and their corresponding hydrates, aluminum nitrate, aluminum nitrite and their corresponding hydrates, aluminum complexes such as aluminum triformate, aluminum triacetate, aluminum diacetate and aluminum monoacetate, aluminum containing metal organic frameworks, e.g. aluminum fumarate, e.g. Basolite™ A520, and M(II)-aluminum-oxo-hydrates, e.g. hydrogarnet. Aluminum(III) hydroxides may be crystalline or amorphous. Preferably, amorphous aluminum hydroxide is used.

High aluminate cement means a cement containing a high concentration of calcium aluminate phases, e.g., at least 30 wt.-%. More precisely, said mineralogical phase of aluminate type comprises tricalcium aluminate (C3A), monocalcium aluminate (CA), mayenite (C12A7), tetracalcium aluminoferrite (C4AF), or a combination of several of these phases.

Sulfoaluminate cement has a content of ye'elimite (of chemical formula $4CaO \cdot 3Al_2O_3 \cdot SO_3$ or C4A3$ in cement notation) of typically greater than 15 wt.-%.

Suitable synthetic calcium aluminate mineral phases include amorphous mayenite (C12A7).

The construction composition comprises a sulfate source iii). The sulfate source is a compound capable of providing sulfate ions in an alkaline aqueous environment. Generally, the sulfate source has an aqueous solubility of at least 0.6 mmol $g \cdot L^{-1}$ at a temperature of 30 °C. The aqueous solubility of the sulfate source is suitably determined in water with a starting pH value of 7.

Specifically, the molar ratio of total available aluminate to sulfate is in the range of 0.4 to 2.0, preferably 0.57 to 0.8, in particular about 0.67. This means that the mixing ratios in the composition are adjusted so that the highest possible proportion of ettringite is formed from the available aluminate.

As mentioned earlier, Portland cement in its commercially available form typically contains small amounts of a sulfate source. If the intrinsic amount of sulfate is unknown, it can be determined by methods familiar to the skilled person such as elemental analysis by XRF. As the sulfate source commonly used in the cement production, alkaline earth metal sulfates, alkali metal sulfates, or mixed forms thereof, such as gypsum, hemihydrate, anhydrite, arkanite, thenardite, syngenite, langbeinite, are typically crystalline, the amount thereof can also be determined by XRD. Both the intrinsic amount of sulfate and any added extraneous sulfate source are considered in the calculation of the molar ratio of total available aluminate to sulfate.

In general, the extraneous sulfate source may be selected from calcium sulfate dihydrate, anhydrite, α- and β-hemihydrate, i.e. α-bassanite and β-bassanite, or mixtures thereof.

Preferably the calcium sulfate source is α-bassanite and/or β-bassanite. Other sulfate sources are alkali metal sulfates like potassium sulfate or sodium sulfate.

It is envisaged that an additive can act as a source of both aluminate and sulfate, such as aluminum sulfate hexadecahydrate or aluminum sulfate octadecahydrate.

Preferably, the sulfate source iii) is a calcium sulfate source. The calcium sulfate source is generally comprised in an amount of 3 to 20 wt.-%, preferably 10 to 15 wt.-%, relative to the amount of cementitious binder i).

In an embodiment, the construction composition additionally comprises at least one of a latent hydraulic binder, a pozzolanic binder and a filler material v).

For the purposes of the present invention, a "latent hydraulic binder" is preferably a binder in which the molar ratio (CaO+MgO):$SiO_2$ is from 0.8 to 2.5 and particularly from 1.0 to 2.0. In general terms, the above-mentioned latent hydraulic binders can be selected from industrial and/or synthetic slag, in particular from blast furnace slag, electrothermal phosphorous slag, steel slag and mixtures thereof. The "pozzolanic binders" can generally be selected from amorphous silica, preferably precipitated silica, fumed silica and microsilica, ground glass, metakaolin, aluminosilicates, fly ash, preferably brown-coal fly ash and hard-coal fly ash, natural pozzolans such as tuff, trass and volcanic ash, calcined clays, burnt shale, rice husk ash, natural and synthetic zeolites and mixtures thereof.

The slag can be either industrial slag, i.e. waste products from industrial processes, or else synthetic slag. The latter can be advantageous because industrial slag is not always available in consistent quantity and quality.

Blast furnace slag (BFS) is a waste product of the glass furnace process. Other materials are granulated blast furnace slag (GBFS) and ground granulated blast furnace slag (GGBFS), which is granulated blast furnace slag that has been finely pulverized. Ground granulated blast furnace slag varies in terms of grinding fineness and grain size distribution, which depend on origin and treatment method, and grinding fineness influences reactivity here. The Blaine value is used as parameter for grinding fineness, and typically has an order of magnitude of from 200 to 1000 $m^2$ $kg^{-1}$, preferably from 300 to 500 $m^2$ $kg^{-1}$. Finer milling gives higher reactivity.

For the purposes of the present invention, the expression "blast furnace slag" is however intended to comprise materials resulting from all of the levels of treatment, milling, and quality mentioned (i.e. BFS, GBFS and GGBFS). Blast furnace slag generally comprises from 30 to 45% by weight of CaO, about 4 to 17% by weight of MgO, about 30 to 45% by weight of $SiO_2$ and about 5 to 15% by weight of $Al_2O_3$, typically about 40% by weight of CaO, about 10% by weight of MgO, about 35% by weight of $SiO_2$ and about 12% by weight of $Al_2O_3$.

Electrothermal phosphorous slag is a waste product of electrothermal phosphorous production. It is less reactive than blast furnace slag and comprises about 45 to 50% by weight of CaO, about 0.5 to 3% by weight of MgO, about 38 to 43% by weight of $SiO_2$, about 2 to 5% by weight of $Al_2O_3$ and about 0.2 to 3% by weight of $Fe_2O_3$, and also fluoride and phosphate. Steel slag is a waste product of various steel production processes with greatly varying composition.

Amorphous silica is preferably an X ray-amorphous silica, i.e. a silica for which the powder diffraction method reveals no crystallinity. The content of $SiO_2$ in the amorphous silica of the invention is advantageously at least 80% by weight, preferably at least 90% by weight. Precipitated silica is obtained on an industrial scale by way of precipitating processes starting from water glass. Precipitated silica from some production processes is also called silica gel.

Fumed silica is produced via reaction of chlorosilanes, for example silicon tetrachloride, in a hydrogen/oxygen flame. Fumed silica is an amorphous $SiO_2$ powder of particle diameter from 5 to 50 nm with specific surface area of from 50 to 600 $m^2$ $g^{-1}$.

Microsilica is a by-product of silicon production or ferrosilicon production, and likewise consists mostly of amorphous $SiO_2$ powder. The particles have diameters of the order of magnitude of 0.1 μm. Specific surface area is of the order of magnitude of from 15 to 30 $m^2$ $g^{-1}$.

Metakaolin is produced when kaolin is dehydrated. Whereas at from 100 to 200 °C kaolin releases physically bound water, at from 500 to 800 °C a dehydroxylation takes place, with collapse of the lattice structure and formation of metakaolin ($Al_2Si_2O_7$). Accordingly pure metakaolin comprises about 54% by weight of $SiO_2$ and about 46% by weight of $Al_2O_3$.

Fly ash is produced inter alia during the combustion of coal in power stations. Class C fly ash (brown-coal fly ash) comprises according to WO 08/012438 about 10% by weight of CaO, whereas class F fly ash (hard-coal fly ash) comprises less than 8% by weight, preferably less than 4% by weight, and typically about 2% by weight of CaO.

For the purposes of the present invention, a "filler material" can be for example silica, quartz, sand, crushed marble, glass spheres, granite, basalt, limestone, sandstone, calcite, marble, serpentine, travertine, dolomite, feldspar, gneiss, alluvial sands, any other durable aggregate, and mixtures thereof. In particular, the fillers do not work as a binder.

Preferably, the construction composition comprises less than 5 wt.-%, more preferably less than 3.5 wt.-%, most preferably less than 2 wt.-% of cementitious hydration products, relative to the total weight of the construction composition. It generally suffices to assess the following cementitious hydration products: ettringite, portlandite, syngenite. The presence and concentrations of these cementitious hydration products can be determined by Rietveld refinement of an X-ray diffraction (XRD) powder pattern. This means that the construction composition has no history of storage in high humidity environments. We believe that otherwise, ettringite among other cementitious hydration products is formed already in the powdery composition. Although these ettringite crystals are broken up at the time of mixing the construction composition with water at the time of use, the ettringite formation control provided by the invention is less prominent. Thus, storage of the construction composition in high humidity environments should be avoided.

The invention also relates to the construction composition according to the invention in freshly mixed form, i.e. comprising water. Preferably, the ratio of water to cementitious binder i) is in the range of 0.2 to 0.7, preferably in the range of 0.25 to 0.5.

The freshly mixed construction composition can be for example concrete, mortar or grouts.

The term "mortar" or "grout" denotes a cement paste to which are added fine aggregates, i.e. aggregates whose diameter is between 150 μm and 5 mm (for example sand), and optionally very fine aggregates. A grout is a mixture of sufficiently low viscosity for filling in voids or gaps. Mortar viscosity is high enough to support not only the mortar's own weight but also that of masonry placed above it. The term "concrete" denotes a mortar to which are added coarse aggregates, i.e. aggregates with a diameter of greater than 5 mm.

The construction composition may be provided as a dry mix to which water is added on-site to obtain the freshly mixed construction composition. Alternatively, the construction composition may be provided as a ready-mixed or freshly mixed composition.

The aqueous freshly mixed construction composition is obtainable by mixing a powdery component C, containing the cementitious binder i) and the sulfate source iii), and a liquid aqueous component W, wherein ingredients iv-a) and iv-b) are contained in one or both of components C and W. The polyol iv-c) and dispersant iv-d) are preferably comprised in component W. The optional extraneous aluminate source ii) is preferably comprised in component C.

The sequence of addition of the optional ingredient v), i.e. at least one of a latent hydraulic binder, a pozzolanic binder and a filler material, depends primarily on the water content of ingredient v). When ingredient v) is provided in an essentially anhydrous form, it can conveniently be included in component C. Otherwise, and more commonly, ingredient v) is pre-mixed with component W, and component C is blended in subsequently.

This mixing regimen prevents the immediate formation of ettringite, which would occur if the cementitious binder i) is exposed to water without the simultaneous presence of ingredients iv-a) and iv-b) which effectively control ettringite formation.

In a practical embodiment, the ingredients iv-a) and iv-b), the polyol iv-c) and dispersant iv-d) are dissolved in a part of the mixing water, and moist ingredients v), such as sand, are admixed. Subsequently, a pre-blended mix of the cementitious binder i), the sulfate source iii), optionally the extraneous aluminate source ii) and optionally anhydrous ingredients v), such as limestone, is added to the mixture. The remainder of the water is then added to adjust consistency.

Preferably, the at least one of a latent hydraulic binder, a pozzolanic binder and a filler material v) is present in an amount of 500 to 1900 kg per $m^3$, preferably 700 to 1700 kg per $m^3$, of the freshly mixed construction composition.

The construction composition according to the invention is useful in applications such as producing building products, in particular for concretes such as on-site concrete, finished concrete parts, manufactured concrete parts (MCP's), pre-cast concrete parts, concrete goods, cast concrete stones, concrete bricks, in-situ concrete, ready-mix concrete, air-placed concrete, sprayed concrete/mortar, concrete repair systems, 3D printed concrete/mortar, industrial cement flooring, one-component and two-component sealing slurries, slurries for ground or rock improvement and soil conditioning, screeds, filling and self-levelling compositions, such as joint fillers or self-levelling underlayments, high performance concrete (HPC) and ultra high performance concrete (UHPC), hermetic fabricated concrete slabs, architectural concrete, tile adhesives, renders, cementitious plasters, adhesives, sealants, cementitious coating and paint systems, in particular for tunnels, waste water drains, screeds, mortars, such as dry mortars, sag resistant, flowable or self-levelling mortars, drainage mortars and concrete, or repair mortars, grouts, such as joint grouts, non-shrink grouts, tile grouts, injection grouts, wind-mill grouts (wind turbine grouts), anchor grouts, flowable or self-levelling grouts, ETICS (external thermal insulation composite systems), EIFS grouts (Exterior Insulation Finishing Systems, swelling explosives, waterproofing membranes or cementitious foams.

The invention is further illustrated by the appended drawing and the examples that follow.

FIG. 1 shows a plot of the photo current signal in mV against the time of dosage of $CaCl_2$ in the calcium aluminate precipitation test according to one embodiment of the invention.

METHODS

Calcium Aluminate Precipitation Test

For the calcium aluminate precipitation test, an automated titration module (Titrando 905, available from Metrohm) equipped with a high performance pH-electrode (iUnitrode with Pt 1000, available from Metrohm) and a photosensor (Spectrosense 610 nm, available from Metrohm) was used. First, a solution of 400 mL of a 1 wt.-% aqueous solution of a polyol to be investigated and 20 mL of a 1 mol/L NaOH aqueous solution was equilibrated for 2 min under stirring in the automated titration module. Then, 50 mL of a 25 mmol/L $NaAlO_2$ aqueous solution was added thereto, followed by equilibration for another 2 min, obtaining an essentially clear test solution. In a next step, the test solution is titrated with a 0.5 mol/L $CaCl_2$ aqueous solution which is dosed with a constant rate of 2 mL/min. During the whole experiment, the temperature is hold constant at 20 °C. The elapsed time to a turbidity inflection is recorded. To this end, the photo current signal in mV is plotted against the time of dosage of the $CaCl_2$ aqueous solution. From the diagram, the onset point is determined as the intersection of the baseline tangent with a tangent to the curve after the inflection of the curve.

Molecular Weight Determination of the Polymeric Polycarboxylic Acids

The molecular weights of the polymeric polycarboxylic acids used in the examples are based on the information provided by the supplier. The molecular weight was determined by gel permeation chromatography (GPC) with aqueous eluents (Column combination: OH-Pak SB-G, OH-Pak SB 804 HQ and OH-Pak SB 802.5 HQ by Shodex, Japan; eluent: 80 vol.-% aqueous solution of $HCO_2NH_4$ (0.05 mol/l) and 20 vol.-% methanol; injection volume 100 μl; flow rate 0.5 ml/min). The molecular weight calibration was performed with poly(acrylate) standards for the RI detector. Standards were purchased from PSS Polymer Standards Service, Germany.

Testing Procedure—Mini-Slump

The used procedure is analogous to DIN EN 12350-2, with the modification that a mini-slump cone (height: 15 cm, bottom width: 10 cm, top width: 5 cm) was used instead of a conventional Abrams cone. 2 L of the aqueous freshly mixed construction composition were filled into the mini-slump cone. The cone was filled completely immediately after mixing. Afterwards, the cone was placed on a flat surface, and lifted, and the slump of the mortar mix was measured. The slump of all mixes was adjusted to 11 cm by adjusting the dosage of the superplasticizer to allow for comparability.

Testing Procedure—Early Strength Development for Mortars

The adjusted mortar mixes were each filled into mortar steel prisms (16/4/4 cm), and after 3 h at a temperature of 20 °C and relative humidity of 65%, a hardened mortar prism was obtained. The hardened mortar prism was demolded and compressive strength was measured according to DIN EN 196-1. The mortar prism was measured again after 24 h.

Testing Procedure—Setting Time

Setting time was determined with a Vicat needle according to DIN EN 480.

EXAMPLES

Reference Example: Calcium Aluminate Precipitation-Inhibiting Properties of Polyols Various polyols were assed for their precipitation-properties in the calcium aluminate precipitation test. The results are shown in the table that follows. For the control, 400 mL of bidestilled water was used instead of 400 mL of a 1 wt.-% aqueous solution of a polyol. The titration endpoint, expressed as the maximum calcium concentration (as $Ca^{2+}$) before the onset of turbidity, is calculated from the elapsed time to the onset point. FIG. 1 shows a plot of the photo current signal in mV against the time of dosage of $CaCl_2$. Curve a) of FIG. 1 shows the results in the absence of a polyol ("blank"). Curve b) of FIG. 1 shows the results for addition of 1% of triethanolamine. For curve b), a first tangent 1, referred to as "baseline tangent", and a second tangent 2 are shown. From the baseline tangent 1 and the second tangent 2, the onset point in s may be determined as the intersection of the baseline tangent 1 with the second tangent 2.

| Polyol | control (without polyol) | ethylene glycol | glycerol | triethanol-amine | erythrit |
|---|---|---|---|---|---|
| Onset point [s] | 42 | 42 | 64 | 500 | 686 |
| Ca endpoint [ppm] | 59 | 59 | 93 | 682 | 924 |

Calorimetry Measurements on Cement Pastes

Various mortar mixes were prepared, adjusted to the same slump and their early strength development was measured. The basic recipe is as follows, to which further ingredients were added as described in detail below.

| Material | Amount [kg/$m^3$] |
|---|---|
| Cementitious binder | 542 |
| Limestone powder | 68 |
| Anhydrite (CAB 30) | 54 |
| Water | 209 |
| Quartz sand (0.1-0.3 mm) | 155 |
| Quartz sand (0.3-1 mm) | 118 |
| Natural sand (0-4 mm) | 977 |
| Crushed stones (2-5 mm) | 279 |

Cement pastes were prepared with 47.5 g of Mergelstetten CEM 142.5 N, 2.5 g of anhydrite (CAB 30, available from Lanxess) and a total amount of water of 20 g (water/cement=0.42). Retarder 7 of WO 2019/077050 was used as glyoxylic acid urea polycondensate.

The calorimetric results summarized in Table 1 were obtained with a Tam Air calorimeter operated in isothermal conditions at 20 °C. Calorimetric analytical techniques involve the measurement of heat that is evolved or absorbed during a chemical reaction. The dissolution of the aluminate phase is accompanied by heat evolution. The time until the peak of the heat evolution is reached is indicative of the open time.

TABLE 1

Cement pastes

| # | Retarder | carboxyl groups [meq/g] | $M_W$ [g/mol] | Retarder Dosage [1] [g] | $NaHCO_3$ (iv-b) [g] | Sodium gluconate (e-1) [g] | Glycerol (iv-c) [g] | Time for peak of aluminate reaction [h] |
|---|---|---|---|---|---|---|---|---|
| 1 | — | — | — | — | 0 | 0 | 0 | <0.25 |
| 2 | — | — | — | — | 0.15 | 0.0314 | 0.126 | <0.25 |
| 3* | glyoxylic acid urea polycondensate | 8.6 | 6,000 | 0.0940 | 0.15 | 0.0314 | 0.126 | 1.75 |
| 4 | Sokalan PA 20 | 13.9 | 2,500 | 0.0431 | 0.15 | 0.0314 | 0.126 | 3.25 |
| 5 | Sokalan PA 15 | 13.9 | 1,200 | 0.0431 | 0.15 | 0.0314 | 0.126 | 0.75 |
| 6 | Sokalan CP 10S | 13.9 | 4,000 | 0.0431 | 0.15 | 0.0314 | 0.126 | 1.25 |
| 7 | Sokalan PA 25 CL PN | 13.9 | 4,000 | 0.0431 | 0.15 | 0.0314 | 0.126 | 0.75 |
| 8 | Sokalan CP 12S | 15.9 | 3,000 | 0.0431 | 0.15 | 0.0314 | 0.126 | 0.50 |
| 9 | Sokalan PA 40 | 13.9 | 15,000 | 0.0431 | 0.15 | 0.0314 | 0.126 | 0.50 |
| 10 | Polymer 1 [2] | 10.7 | 2,500 | 0.0431 | 0.15 | 0.0314 | 0.126 | 0.75 |
| 11 | Polymer 2 [3] | 2.9 | 2,500 | 0.0431 | 0.15 | 0.0314 | 0.126 | 0.25 |
| 12 | Polymer 3 [4] | 9.9 | 1,500 | 0.0431 | 0.15 | 0.0314 | 0.126 | 0.75 |

[1] doseage calculated as active substance

[2] low molecular weight co-polymer of acrylic acid, methacrylic acid and methallyl sulfonic acid (wt.-%-ratio 0.42:0.42:0.16).

[3] low molecular weight co-polymer of hydroxy propyl acrylate, methacrylic acid and methallyl sulfonic acid (wt.-%-ratio 0.59:0.25:0.16).

[4] low molecular weight co-polymer of methacrylic acid and methallyl sulfonic acid (wt.-%-ratio 0.85:0.15).

It is evident that the presence of polymeric polycarboxylic acids markedly delays the exothermic aluminate phase dissolution.

Evaluation of Open Time and Compressive Strength of Mortar Mixes

Mortar mixes 1 to 21 were prepared, adjusted to the same slump and their early strength development was measured. As cementitious binder, Karlstadt CEM I 42.5 R (0.092 mol total available aluminate per 100 g) or Mergelstetten CEM 142.5 N (0.084 mol total available aluminate per 100 g) was used.

Mixing Procedure

Crushed stones (2 to 5 mm) were dried in an oven at 70 °C for 50 h. Sand (0 to 4 mm) was dried for 68 h at 140 °C. Afterwards, the crushed stones and sand were stored at 20 °C for at least 2 days at 65% relative humidity. A retarder (retarder 7 of WO 2019/077050 as glyoxylic acid urea polycondensate or MasterRoc® HCA 10, a mixture of citric acid and phosphonobutantricarboxylic acid, available from Master Builders Solutions Deutschland GmbH), sodium gluconate, $Na_2CO_3$ and a polycarboxylate based superplasticizer (Master Suna SBS 8000 or Master Glenium ACE 30, both available from Master Builders Solutions Deutschland GmbH) according to Table 2 were added to the total amount of mixing water, so as to obtain a liquid aqueous component. Subsequently, crushed stones, sands, cementitious binder and anhydrite were added to a 5 L Hobbart mixer. The liquid aqueous component was added thereto and the mixture was stirred for 2 min at level 1 (107 rpm) and for further 2 min at level 2 (198 rpm) to obtain an aqueous freshly mixed construction composition.

TABLE 2

| Mortar mixes | | | | | | |
|---|---|---|---|---|---|---|
| # | Cementitious binder | CAB 30 [wt.-%] | Ratio Aluminate/ Sulfate | Water/ Cement | Retarder | Dosage [wt.-%] [1] |
| 1* | Karlstadt CEM I 42.5 R | 15.0 | 0.61 | 0.37 | urea-glyoxylic acid condensate | 0.50 |
| 2* | Karlstadt CEM I 42.5 R | 15.0 | 0.61 | 0.37 | urea-glyoxylic acid condensate | 0.50 |
| 3* | Karlstadt CEM I 42.5 R | 15.0 | 0.61 | 0.37 | Sokalan PA 15 | 0.50 |
| 4* | Karlstadt CEM I 42.5 R | 15.0 | 0.61 | 0.37 | Sokalan PA 15 | 1.00 |
| 5* | Karlstadt CEM I 42.5 R | 15.0 | 0.61 | 0.37 | Sokalan PA 15 | 0.30 |
| 6* | Karlstadt CEM I 42.5 R | 15.0 | 0.61 | 0.37 | Sokalan PA 15 | 0.10 |
| 7* | Karlstadt CEM I 42.5 R | 15.0 | 0.61 | 0.37 | urea-glyoxylic acid condensate | 1.00 |
| 8 | Karlstadt CEM I 42.5 R | 15.0 | 0.61 | 0.37 | Sokalan PA 15 | 1.00 |
| 9* | Karlstadt CEM I 42.5R | 15.0 | 0.61 | 0.37 | Sokalan PA 15 | 1.00 |
| 10* | Karlstadt CEM I 42.5R | 15.0 | 0.61 | 0.37 | Sokalan PA 15 | 1.00 |
| 11* | Karlstadt CEM I 42.5 R | 0 | 2.02 | 0.37 | urea-glyoxylic acid condensate | 0.50 |
| 12* | Karlstadt CEM I 42.5 R | 0 | 2.02 | 0.37 | Sokalan PA 15 | 0.50 |
| 13* | Karlstadt CEM I 42.5 R | 5.0 Hemi-hydrate | 1.19 | 0.37 | urea-glyoxylic acid condensate<br>Sodium gluconate | 0.30<br>0.10 |
| 14 | Karlstadt CEM I 42.5 R | 5.0 Hemi-hydrate | 1.19 | 0.37 | Sokalan PA 15<br>Sodium gluconate | 0.20<br>0.10 |
| 15 | Karlstadt CEM I 42.5 R | 5.0 Hemi-hydrate | 1.19 | 0.37 | Sokalan PA 20<br>Sodium gluconate | 0.20<br>0.10 |
| 16 | Karlstadt CEM I 42.5 R | 15.0 | 0.61 | 0.37 | MasterRoc ® HCA 10 | 0.50 |
| 17 | Karlstadt CEM I 42.5 R | 15.0 | 0.61 | 0.37 | MasterRoc ® HCA 10 | 0.50 |
| 18* | Karlstadt CEM I 42.5 R | 15.0 | 0.61 | 0.37 | — | 0 |
| 19* | Mergelstetten CEM I 42.5 N | 10.0 | 0.76 | 0.37 | urea-glyoxylic acid polycondensate | 0.23 |
| 20 | Mergelstetten CEM I 42.5 N | 10.0 | 0.76 | 0.37 | Sokalan PA 20 | 0.23 |
| 21 | Mergelstetten CEM I 42.5 N | 10.0 | 0.76 | 0.37 | Sokalan PA 15 | 0.23 |

TABLE 2-continued

| Mortar mixes | | | | | | | | |
|---|---|---|---|---|---|---|---|---|
| # | $Na_2CO_3$ [wt.-%] | Polyol | Dosage [wt.-%] | Dispersant | Dosage [wt.-%] [1] | Open time [min] | Comp. strength [MPa] 3 h | 24 h |
| 1* | 0.90 | Glycerol | 0.30 | Master Suna SBS 8000 | 0.20 | 15 | 10.8 | 19.7 |
| 2* | 0 | — | | Master Suna SBS 8000 | 0.13 | 20 | 0 | 14.8 |
| 3* | 0 | — | | Master Suna SBS 8000 | 0.20 | <5 | 0 | 0 |
| 4* | 0 | — | | Master Glenium ACE 30 | 0.30 | <5 | 0 | 0 |
| 5* | 0 | — | | Master Glenium ACE 30 | 0.30 | <5 | 0 | 0 |
| 6* | 0 | — | | Master Glenium ACE 30 | 0.30 | <5 | 0 | 0 |
| 7* | 0.90 | Glycerol | 0.30 | Master Suna SBS 8000 | 0.20 | 90 | 10.6 | 21.9 |
| 8 | 0.90 | Glycerol | 0.30 | Master Suna SBS 8000 | 0.15 | 40 | 11.7 | 13.4 |
| 9* | 0 | Glycerol | 0.30 | Master Suna SBS 8000 | 0.20 | <5 | 3.3 | 3.6 |
| 10* | 0.90 | — | | Master Suna SBS 8000 | 0.12 | 30 | 5.2 | 8.1 |
| 11* | 0 | — | | Master Suna SBS 8000 | 0.13 | 30 | 0 | 24.0 |
| 12* | 0 | — | | Master Suna SBS 8000 | 0.20 | <5 | 0 | 0 |
| 13* | 0.90 | Glycerol | 0.30 | Master Suna SBS 8000 | 0.15 | 70 | 13.0 | 19.8 |
| 14 | 0.90 | Glycerol | 0.30 | Master Suna SBS 8000 | 0.11 | 80 | 13.2 | 25.9 |
| 15 | 0.90 | Glycerol | 0.30 | Master Suna SBS 8000 | 0.12 | 80 | 11.0 | 24.6 |
| 16 | 0.90 | Glycerol | 0.30 | Master Suna SBS 8000 | 0.26 | 20 | 15.5 | 15.4 |
| 17 | 0.90 | Sucrose | 0.30 | Master Suna SBS 8000 | 0.26 | 50 | 10.4 | n.d. [2] |
| 18* | 0.9 | Glycerol | 0.30 | Master Suna SBS 8000 | 0.26 | <5 | 10.4 | n.d. |
| 19* | 0.37 | Glycerol | 0.31 | Master Suna SBS 8000 | 0.13 | 60 | 7.8 | 31.5 |
| 20 | 0.37 | Glycerol | 0.31 | Master Suna SBS 8000 | 0.09 | 40 | 7.1 | 26.9 |
| 21 | 0.37 | Glycerol | 0.31 | Master Suna SBS 8000 | 0.09 | 50 | 7.3 | 28.1 |

*comparative example
[1] doseage calculated as active substance
[2] n.d. = not determined Construction Research & Technology GmbH The inventive mixes show rapid strength development once setting commences. Hence, the open time largely corresponds to the setting time.

It is evident that the carbonate source and the polyol act in a synergistic fashion, evidenced by comparison of examples with both compounds and examples lacking one of the two (e.g., comparison of examples 8 to 10).

The invention claimed is:

1. A set control composition for cementitious systems comprising
a) a retarder selected from
(a-1) polymeric polycarboxylic acids selected from homopolymers and copolymers of α,β-ethylenically unsaturated carboxylic acids and salts thereof, and copolymers of at least one α,β-ethylenically unsaturated carboxylic acid and at least one sulfo group containing monomer and salts thereof, whose milliequivalent number of carboxyl groups is 3.0 meq/g or higher and having a molecular weight 25,000 g/mol or less, assuming all the carboxyl groups to be in unneutralized form,
(a-2) phosphonic acids and salts thereof,
(a-3) low molecular weight polycarboxylic acids and salts thereof having a molecular weight of 500 g/mol or lower, and
mixtures thereof,
b) at least one of
(b-1) a borate source, or
(b-2) a carbonate source, wherein the carbonate source is selected from inorganic carbonates having an aqueous solubility of 0.1 $g \cdot L^{-1}$ or more at 25 °C, and organic carbonates, in a weight ratio of b) to a) in the range of 0.1 to 10,
c) a polyol having at least 3 alcoholic hydroxyl groups in its molecule, in a weight ratio of c) to a) in the range of 0.2 to 4, and
d) a dispersant,
wherein the set control composition does not contain an amine-glyoxylic acid condensate.

2. The set control composition according to claim 1, further comprising e) a co-retarder selected from hydroxy monocarboxylic acids and salts thereof.

3. The set control composition according to claim 1, wherein the polymeric polycarboxylic acid is a homopolymer of acrylic acid, a homopolymer of methacrylic acid, a copolymer of acrylic acid and maleic acid, or a copolymer of methacrylic acid and maleic acid.

4. The set control composition according to claim 1, wherein the inorganic carbonate is selected from sodium carbonate, sodium bicarbonate, potassium carbonate, lithium carbonate and magnesium carbonate; and the organic carbonate is selected from ethylene carbonate, propylene carbonate and glycerol carbonate.

5. The set control composition according to claim 1, wherein the polyol is selected from sugar alcohols and saccharides.

6. The set control composition according to claim 1, wherein the polyol, in a calcium aluminate precipitation test in which a test solution, obtained by supplementing 400 mL of a 1 wt.-% aqueous solution of the polyol with 20 mL of a 1 mol/L NaOH aqueous solution and 50 mL of a 25 mmol/L $NaAlO_2$ aqueous solution, is titrated with a 0.5 mot/L $CaCl_2$ aqueous solution at 20 °C, inhibits precipitation of calcium aluminate up to a calcium concentration of 75 ppm.

7. The set control composition according to claim 6, wherein the polyol is selected from monosaccharides, oligosaccharides, water-soluble polysaccharides, compounds of general formula (P-I) or dimers or trimers of compounds of general formula (P-I):

(P-I)

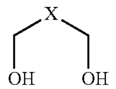

wherein X is (P-Ia)

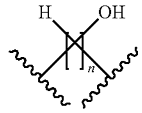

, (P-Ib)

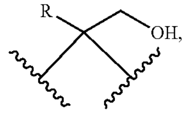

or (P-Ic)

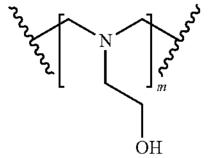

wherein

R is —$CH_2OH$, —$NH_2$, n is an integer from 1 to 4, m is an integer from 1 to 8.

8. The set control composition according to claim 1, wherein the dispersant is selected from the group of comb polymers having a carbon-containing backbone to which are attached pendant cement-anchoring groups and polyether side chains, non-ionic comb polymers having a carbon-containing backbone to which are attached pendant hydrolysable groups and polyether side chains, the hydrolysable groups upon hydrolysis releasing cement-anchoring groups, colloidally disperse preparations of polyvalent metal cations and a polymeric dispersant which comprises anionic and/or anionogenic groups and polyether side chains, and the polyvalent metal cation is present in a superstoichiometric quantity, calculated as cation equivalents, based on the sum of the anionic and anionogenic groups of the polymeric dispersant, sulfonated melamine-formaldehyde condensates, lignosulfonates, sulfonated ketone-formaldehyde condensates, sulfonated naphthalene-formaldehyde condensates, phosphonate containing dispersants, preferably the phosphonate containing dispersants comprise at least one polyalkylene glycol unit, and mixtures thereof.

9. A construction composition comprising i) a cementitious binder comprising one or more calcium silicate mineral phases and one or more calcium aluminate mineral phases, ii) optionally, an extraneous aluminate source, iii) a sulfate source, wherein the construction composition contains 0.05 to 0.2 mol of total available aluminate, calculated as $A(OH)_4^-$, from the calcium aluminate mineral phases plus the optional extraneous aluminate source, per 100 g of cementitious binder i), and the molar ratio of total available aluminate to sulfate is 0.4 to 2.0, wherein the construction composition additionally comprises iv) a set control composition comprising iv-a) a retarder selected from (a-1) polymeric polycarboxylic acids selected from homopolymers and copolymers of α,β-ethylenically unsaturated carboxylic acids and salts thereof, and copolymers of at least one α,β-ethylenically unsaturated carboxylic acid and at least one sulfo group containing monomer and salts thereof, whose milliequivalent number of carboxyl groups is 3.0 meq/g or higher, having a molecular weight in the range of 25,000 g/mol or less, assuming all the carboxyl groups to be in unneutralized form, (a-2) phosphonic acids and salts thereof, (a-3) low molecular weight polycarboxylic acids and salts thereof having a molecular weight of 500 g/mol or lower, and mixtures thereof;

iv-b) at least one of (b-1) a borate source, or (b-2) a carbonate source, wherein the carbonate source is selected from inorganic carbonates having an aqueous solubility of 0.1 $g \cdot L^{-1}$ or more at 25 °C, and organic carbonates, in a weigth ratio of iv-b) to iv-a) in the range of 0.1 to 10;

iv-c) a polyol having at least 3 alcoholic hydroxyl groups in its molecule in a weight ratio of iv-c) to iv-a) in the range of 0.2 to 4; and iv-d) a dispersant, wherein the set control composition does not contain an amino-glyoxylic acid condensate.

10. The construction composition according to claim 9, comprising, relative to the amount of cementitious binder i)

iv-a) in an amount of 0.1 to 2 wt.-%, iv-b) in an amount of 0.2 to 1 wt.-% and iv-c) in an amount of 0.2 to 2.5 wt.-%.

11. The construction composition according to claim 9, wherein the calcium silicate mineral phases and calcium aluminate mineral phases constitute at least 90 wt.-% of the cementitious binder i), and the calcium silicate mineral phases constitute at least 60 wt.-% of the cementitious binder i).

12. The construction composition according to claim 9, wherein the construction composition additionally comprises v) at least one of a latent hydraulic binder, a pozzolanic binder and a filler material.

13. The construction composition according to claim 9, wherein the extraneous aluminate source ii) is selected from non-calciferous aluminate sources selected from aluminum (III) salts, aluminum(III) complexes, crystalline aluminum hydroxide, amorphous aluminum hydroxide; and calciferous aluminate sources selected from high alumina cement, sulfoaluminate cement or synthetic calcium aluminate mineral phases.

14. The construction composition according to claim 9, wherein the sulfate source iii) is a calcium sulfate source.

15. The construction composition according to claim 9, in freshly mixed form, wherein the ratio of water to cementitious binder i) is in the range of 0.2 to 0.7.

* * * * *